United States Patent [19]

O'Cheskey et al.

[11] 4,255,262

[45] Mar. 10, 1981

[54] HYDRAULIC POWERED MIXING APPARATUS

[75] Inventors: Theodore H. O'Cheskey, Whittier; Carroll C. Bunker, Covina, both of Calif.

[73] Assignee: U.S. Filter Corporation, Whittier, Calif.

[21] Appl. No.: 23,848

[22] Filed: Mar. 26, 1979

Related U.S. Application Data

[63] Continuation of Ser. No. 852,621, Nov. 18, 1977, abandoned.

[51] Int. Cl.³ .......................... B03D 1/02; B03D 1/24
[52] U.S. Cl. ............................... 210/221.2; 209/170; 210/703
[58] Field of Search .................. 209/169, 170; 210/14, 210/44, 60, 63 R, 195.2, 196, 221 M, 221 P, 194, 220; 261/76, 121 R, DIG. 75

[56] References Cited

U.S. PATENT DOCUMENTS

| 699,294 | 5/1902 | Dolphin | 261/DIG. 75 |
|---|---|---|---|
| 1,380,650 | 6/1921 | Hebbard | 209/170 |
| 1,397,815 | 11/1921 | Luckenbach | 209/170 |
| 1,594,947 | 8/1926 | Hartman et al. | 261/76 |
| 2,274,658 | 3/1942 | Booth | 210/44 |
| 2,342,024 | 2/1944 | Walker | 210/44 |
| 2,530,814 | 11/1950 | De Becze et al. | 261/93 |
| 2,633,344 | 3/1953 | Rekk | 261/76 |
| 2,999,595 | 9/1961 | Schoeld et al. | 209/170 |
| 3,420,370 | 1/1969 | Isenhardt et al. | 209/169 |
| 3,722,679 | 3/1973 | Logue | 209/170 X |
| 3,938,738 | 2/1976 | Nagel et al. | 261/DIG. 75 |
| 3,972,815 | 8/1976 | O'Cheskey et al. | 210/219 |
| 4,044,079 | 8/1977 | Tveit | 261/DIG. 75 |
| 4,110,210 | 8/1978 | Degner et al. | 210/44 |

FOREIGN PATENT DOCUMENTS

| 720248 | 10/1965 | Canada | 210/194 |
|---|---|---|---|
| 160475 | 1/1964 | U.S.S.R. | 210/221 P |

*Primary Examiner*—Robert H. Spitzer
*Attorney, Agent, or Firm*—Christie, Parker & Hale

[57] ABSTRACT

Mixing apparatus includes a tank having an upright draft tube extending from above an operating level of liquid contained in the tank to a level near the bottom of the tank, the draft tube being in fluid communication with the tank at a level near the bottom of the tank below the operating level of the liquid. A nozzle is disposed within the draft tube for directing a stream of liquid downwardly against an impingement surface transverse to the draft tube at the level of fluid communication to entrain gas drawn down the draft tube and create a pattern of bubbles flowing radially outwardly from the draft tube. The impingement surface is close to, or is a portion of, the tank bottom so that the radially flowing bubbles sweep across at least a portion of the bottom of the tank.

13 Claims, 5 Drawing Figures

HYDRAULIC POWERED MIXING APPARATUS

CROSS REFERENCE TO RELATED APPLICATIONS

This is a continuation of application Ser. No. 852,621, filed Nov. 18, 1977, now abandoned.

BACKGROUND OF THE INVENTION

This invention relates to apparatus for mixing and dispersing gas in the form of fine bubbles in a body of liquid in a tank. The invention can be used in various ways to mix gas with liquid, for example, to add air or ozone to sewage or to remove dissolved oxygen from water by mixing an inert gas with the water to displace the oxygen.

The apparatus also can be used in flotation processes in which suspended solid particles or immiscible liquid droplets are separated from the main body of the liquid. The small bubbles created by the mixing apparatus selectively attach themselves to the particles or droplets to be removed and provide buoyancy to raise them to the surface of the liquid. The material to be separated is taken from the surface of the liquid in the form of a froth. Chemical reagents can be added to the liquid to enhance film forming and bubble adherence to improve separation efficiency. Reagents that induce a froth are called "frothers". Those that assist in the selective separation of one solid from another in a liquid are called "depressers", "deflocculating agents" and "collectors", depending on the specific function formed by the reagent. A good discussion of mixing apparatus on which the present invention is an improvement is in Chemical Engineering, June 8, 1964, pages 165 through 220.

The following U.S. Patents also describe flotation apparatus on which the present invention is an improvement:

U.S. Pat. No. 953,746—Hoover
U.S. Pat. No. 1,976,956—MacLean
U.S. Pat. No. 2,274,658—Booth
U.S. Pat. No. 2,494,602—Wright
U.S. Pat. No. 2,626,052—Carbonnier
U.S. Pat. No. 2,875,897—Booth
U.S. Pat. No. 3,393,802—Logue, et al
U.S. Pat. No. 3,393,803—Damian, et al
U.S. Pat. No. 3,647,069—Bailey
U.S. Pat. No. 3,775,311—Mook, et al
U.S. Pat. No. 3,972,815—O'Cheskey, et al An exemplary prior art flotation apparatus includes an upright draft tube extending into a body of liquid contained in a flotation cell or tank and an inverted bowl-shaped hood or shroud below the draft tube. An upright rotary shaft extends down the draft tube and rotates an impeller located under the shroud. The action of the impeller forms small bubbles which flow outwardly from under the hood and upwardly through the liquid in the tank.

One disadvantage of this prior art mixing apparatus is that the impeller cannot be set deep enough in large tanks to create sufficient circulation to sweep the bottom clean and still produce the necessary surface flow pattern for the air bubbles to effectively remove material by flotation. This prior art unit also has an undesirable tendency to generate foam which flows in a rotary pattern and stagnates around the draft tube. U.S. Pat. No. 3,972,815 solved these problems of the prior art apparatus by resorting to an elaborate shroud construction having radial vanes and holes in the shroud near the vanes to allow bubbles to circulate upwardly through the holes and radially outwardly toward the edges of the tank. Although highly effective, this mixing apparatus is mechanically complex and consumes substantial quantities of electricity for driving the impeller. Energy consumption can be a substantial factor in the cost of operating such a unit, particularly when a multi-cell unit having a plurality of impellers is employed.

SUMMARY OF THE INVENTION

Briefly, the mixing apparatus of this invention includes a tank for holding a volume of liquid and an upright draft tube disposed in the tank and extending from above an operating level of the liquid in the tank to below the operating level, the draft tube being in fluid communication with the tank at a level near the bottom of the tank. An impingement surface is provided transverse to the draft tube at or just below the level of fluid communication between the draft tube and the tank. A nozzle is disposed within the draft tube for directing a stream of liquid downwardly against the impingement surface. Gas is admitted into the draft tube to be mixed with the liquid in the tank. A stream of liquid is forced through the nozzle toward the impingement surface to entrain bubbles of the gas. The stream of liquid with entrained gas bubbles is deflected by the impingement surface to create a pattern of bubbles flowing radially outwardly from the draft tube into the volume of liquid in the tank. Flange means on the draft tube directs the stream of bubbles substantially horizontally radially outwardly into the volume of liquid in the tank.

The combination of draft tube flange means, nozzle, and impingement surface generates a flow pattern of foam that has no tendency to flow in a rotary pattern and stagnate around the draft tube. Rather the foam continuously moves in a vigorous flow pattern toward the edges of the tank. The moving foam is constantly skimmed over weirs at the sides of the tank and new foam is constantly pulled in place of it. This action improves the effectiveness of each skimmer blade in removing floated material from the cell and greatly reduces reentrainment of the floated material.

This invention eliminates the use of mechanical impellers and propellers which are responsible for the high energy consumption of prior art units. This invention also eliminates the elaborate shrouds and vanes formerly required to achieve a desirable flow pattern of foam in the cell. A flotater unit of the present invention is lighter, cheaper, more simply constructed and more reliable than the above described prior art units and consumes significantly less energy, e.g. 25 to 40 percent less energy, than the mechanical impeller units in achieving a given degree of flotation separation at a given throughput.

In a preferred form of the invention, the draft tube is open at both ends and extends close to the bottom of the tank. A liquid feed pipe extends downwardly within the draft tube and terminates in a nozzle disposed for directing a stream of liquid against the bottom of the tank. The stream of liquid draws gas down the draft tube and entrains it as a stream of bubbles. A flange is provided at the lower end of the draft tube in spaced relation to the bottom of the tank for directing the flow of bubbles radially outwardly across the bottom of the tank to sweep away any material that settles to the bottom.

When the mixing unit of this invention is used for flotation, it preferably has an overflow weir and a skimmer which sweeps foam on the surface over the weir. A liquid inlet valve may be provided in the liquid feed pipe to control the flow rate of liquid through the nozzle to vary the bubble size and the amount of gas mixed with the liquid in the tank. Means may be provided for varying the area of the opening at the upper end of the draft tube to control the flow rate of gas into the draft tube. In use the liquid feed flow and the gas flow can be adjusted independently of each other in each cell to produce the desired liquid to gas ratio in each cell and to produce a gradient in the levels of the liquid in each cell.

These and other aspects of the invention will be more fully understood by referring to the following detailed description and the accompanying drawings.

DETAILED DESCRIPTION OF THE INVENTION

Figure 1:
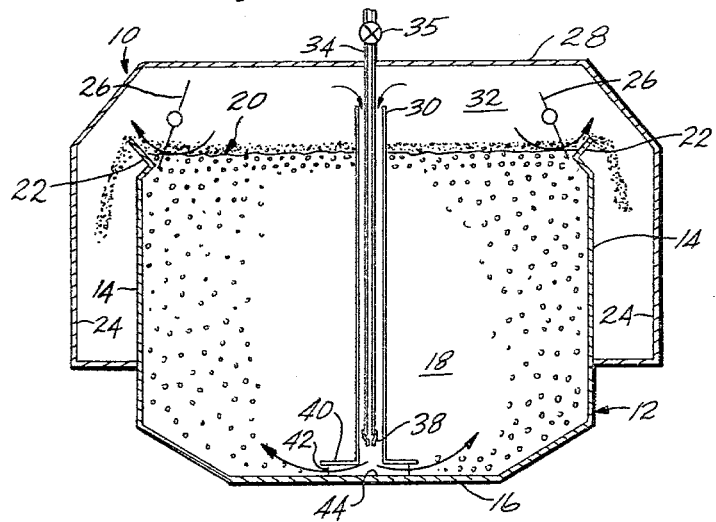
FIG. 1 is a schematic cross sectional view showing a preferred mixing apparatus of this invention.

Referring to FIG. 1 a mixing cell 10 includes a tank 12 with opposite side walls 14 and a bottom 16. The tank holds a body of liquid 18 at an operating level 20 just below a pair of weirs 22 extending along the upper edges of the side walls on the opposite sides of the tank. Preferably the weirs are adjustable in elevation to adjust the operating level of the liquid 18. A separate trough 24 is secured to the outside of the tank under each weir 22 to catch froth skimmed from the tank over the weirs. A pair of elongated skimmers 26 on opposite sides of the tank above the weirs skim froth over the weirs. The skimmers extend a major portion of the length of the tank. A cover 28 encloses the top of the tank. The cover 28 may or may not seal the top of the tank.

A vertical draft tube 30 extends from a level between the cover 28 and the fluid operating level 20 to a level below the operating level 20 of the liquid in the tank. The top of the draft tube may be secured to the cover by welding so that the gas space 32 above the operating level of the liquid is sealed from the draft tube. Alternately, as shown, the upper end of the draft tube is left open in gas communication with gas space 32.

A vertically extending liquid feed pipe 34 passes through the cover 28 and is supported at the point where it passes through the cover, for example, by welding to the cover or by clamp means (not shown). The liquid feed pipe 34 is coaxially disposed within the draft tube. The liquid feed pipe 34 is connected to a pump 36 that forces liquid downwardly through the feed pipe. The feed pipe 34 terminates in a nozzle 38 within the draft tube and spaced above the lower end thereof. The nozzle 38 is situated to direct a forceful stream of liquid downwardly at the bottom of the tank for drawing gas downwardly through the draft tube and entraining the gas as a flowing stream of bubbles.

Radial flange 40 at the lower end of the draft tube extends radially outwardly from the draft tube and generally parallel to the bottom of the tank for directing the stream of liquid with its entrained bubbles radially outwardly across the bottom of the tank. The draft tube 30 and flange 40 are supported in spaced relation to the bottom of the tank by spacers 42 which are small to avoid obstructing the flow of liquid and bubbles outwardly between the flange and the bottom of the tank. The nozzle 38 may have an opening of the same diameter as the inside diameter of the liquid feed pipe 34, or a larger or smaller diameter. Often, the feed pipe 34 has an inside diameter greater than the diameter of the nozzle opening. A valve 35 is provided in the liquid feed line 34 for controlling the rate of liquid flow through the nozzle 38. The draft tube has a selected inner diameter and the liquid feed pipe 34 has an outer diameter smaller than the inner diameter of the draft tube. The draft tube 30 and the concentric feed pipe 34 together define an annular opening at the upper end of the draft tube having a predetermined cross sectional area that may regulate the flow of gas from the gas space 32 into the draft tube.

In use, liquid is admitted to the tank 12 and its operating level is controlled by any suitable means such as those described below with reference to FIG. 2. If the apparatus is used for flotation separation, liquid to be treated flows into the cell through a submerged inlet described below and shown in FIG. 2, and the skimmers 26 sweep foam and separated material or contaminates over the weirs and into the troughs 24. Treated liquid having a lower content of suspended contaminant leaves the tank through a submerged outlet. When the upper end of the draft tube 30 is sealed to the cover 28, gas can be admitted to the draft tube through a hole in the cover under the control of a valve (not shown).

Pump 36 forces a stream of liquid through feed pipe 34 and nozzle 38 toward impingement surface 44. The impingement surface 44 is preferably a portion of the bottom 16 of the tank. The liquid forced through the feed pipe is preferably a recycled stream of treated liquid drawn from tank 12. The nozzle 38 is located below the operating level of the liquid 20 and above the lower end of the draft tube at a level that provides entrainment of gas bubbles in the steam of liquid and creates a pattern of gas bubbles entrained in the liquid. The liquid and entrained gas bubbles flow radially outwardly from the draft tube through an annular opening defined by the lower end of the draft tube or the flange, if any, and the impingement surface.

The inner diameter of the draft tube, the outer diameter of the liquid feed pipe, the spacing between the draft tube flange and the impingement surface, the diameter of the flange, the spacing between the nozzle and the impingement surface, and the volumetric flow rate and the velocity of water through the nozzle are selected (1) to provide sufficient suction to draw gas down the draft tube and entrain bubbles of the gas in the flowing water and (2) to provide effective spread of entrained bubbles across the bottom of the tank and through the body of liquid being treated. Principal factors affecting these selections are the depth of liquid in the tank above the impingement surface, the diameter of the tank bottom to be swept by bubbles from a particular draft tube, and the flow rate through the tank of water being treated.

Moreover, the above-mentioned variables are all interrelated.

Additional variables include the degree of aeration desired (which depends in part upon the nature of the liquid being treated and upon the frothers and other additives used) and the recirculation ratio, i.e., the ratio of the volumetric flow rate of treated liquid through the nozzle or nozzles of a single or multi-cell flotater unit and the volumetric throughput of the unit.

Because of the number and variety of these variables, precise sizes, spacings, and flow rates cannot be stated for all cases. However, the following guidelines will enable one skilled in the art of mechanical or hydraulic engineering to readily construct mixing apparatus in accordance with this invention for use in a particular application. For further guidance, two specific embodiments, a four cell unit having a 40 gallon per minute throughput, and a four cell unit having a 3400 gallon per minute throughput, will be described.

The volumetric flow rate and velocity of liquid through a nozzle in a draft tube are sufficient to set up an adequate circulation pattern of entrained bubbles across the bottom of the tank. Where more than one nozzle and draft tube are used in a cell, the flow through each is sufficient to sweep a corresponding portion of the cell bottom. The flow rate and velocity are adjusted by varying the output of the pump used to force the liquid through the nozzle or by adjusting a valve in the liquid feed pipe.

The size of the nozzle is selected to give the desired volumetric flow rate and velocity of the liquid stream, and it is positioned within the draft tube at a distance from the impingement surface at which effective suction of gas down the draft tube and entrainment of gas in the liquid stream are obtained. The spacing may vary widely, for example from about $\frac{1}{8}$ inch to 5 draft tube diameters or more. The spacing in part depends upon the velocity of the stream of liquid coming from the nozzle. When a low volume, high velocity nozzle is used, the nozzle may be placed relatively high in the draft tube, for example, 1 to 5 or more draft tube diameters (inner diameter) above the impingement surface, e.g. the tank bottom. When a high volume, low velocity nozzle is used, the nozzle is placed close to the impingement surface, for example $\frac{1}{8}$ inch to $\frac{3}{4}$ inch from the impingement surface. When the nozzle is sufficiently close to the impingement surface, a high velocity stream of liquid flowing radially outwardly from the nozzle across the impingement surface creates suction in the draft tube and entrains gas. The diameter of the nozzle will usually be in the range of about 0.05 to about 0.5 times the diameter of the draft tube, but larger or smaller nozzles may be used.

The draft tube has an inner diameter to admit sufficient gas for mixing with the liquid in the tanks, taking into account the diameter of the liquid feed pipe disposed within the draft tube. The inner diameter of the draft tube and the outer diameter of the liquid feed pipe concentrically disposed within the draft tube are selected to define an annular aperture for admission of gas to the draft tube that has sufficient cross-sectional area to provide a substantial, preferably substantially unrestricted, flow of gas down the draft tube. The inner diameter of the draft tube and the area of the annular aperture may be varied widely.

By way of example only, in commercial flotator units having throughputs of about 40 to 5000 gallons per minute, the draft tube in each cell will usually have an inner diameter of about 1 to about 6 inches, and the outer diameter of the liquid feed pipe will be from about 0.5 to about 4 inches. Very large units may have two or more such nozzles and draft tubes per cell, or may have high volume, high velocity nozzles and draft tubes larger than 6 inches.

The draft tube flange has a diameter sufficient to direct the flow of liquid and entrained bubbles substantially horizontally radially outwardly across at least a portion of the bottom of the tank. Typically, the diameter is between about 1.5 and 5 times the diameter of the draft tube. Smaller and larger flanges may also be used, depending upon the size of the tank.

The draft tube flange is adjacent the impingement surface. The spacing between the draft tube flange and the impingement surface, e.g., the bottom of the tank, is adjusted to provide effective radial dispersion of the stream of liquid and entrained bubbles. The stream flowing under the flange creates a low pressure region between the flange and the bottom of the tank that tends to force the flange toward the bottom of the tank. The flange may be supported upon adjustable screws through the flange that merely rest upon the bottom, and during operation, the force created by the rapidly flowing stream tends to hold the draft tube and flange in place. Spacing between the flange and the impingement surface is typically between about 0.1 and about 1 inch. Wider spacing may be used in very large units.

Figure 4:
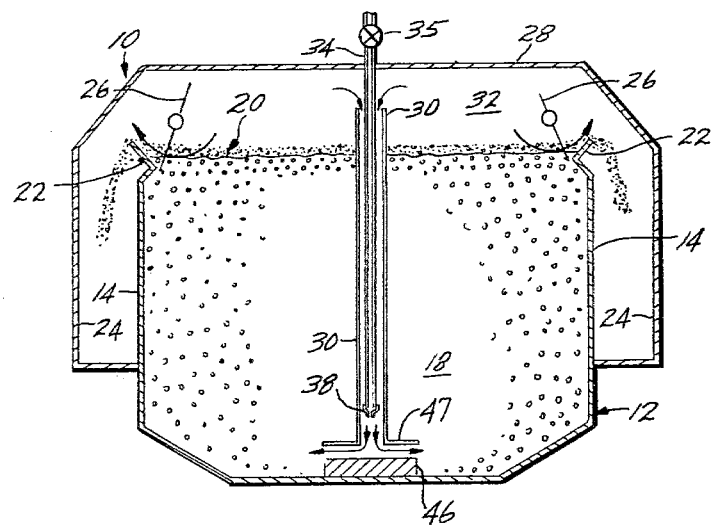
FIGS. 4 and 5 are fragmentary schematic views showing draft tubes having flat and conical flanges and corresponding impingement surfaces affixed to the bottom of the tank.
Figure 5:
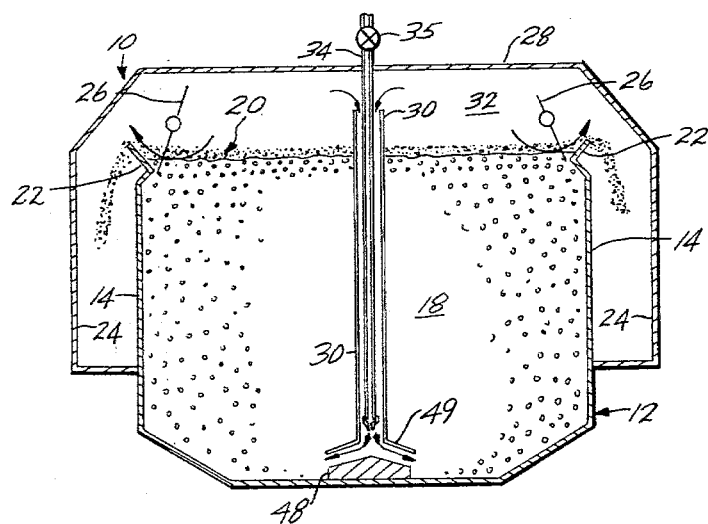

It is preferred to locate the impingement surface near the bottom of the tank so that the radially outward flow of bubbles move across the bottom of the tank to sweep up any matter that may settle there. Desirably, the impingement surface is spaced from the bottom of the tank by no more than about $\frac{1}{4}$ of the operating level of the liquid in the tank, so that the stream of entrained bubbles spreads out and rises through at least about $\frac{3}{4}$ of the volume of liquid in the tank. Preferably, the impingement surface is a portion of the tank bottom itself. If desired, a slightly raised platform may be provided on the bottom of the tank such as a flat platform 46, as shown in FIG. 4, or a conical platform 48, as shown in FIG. 5. The draft tube is fitted with a flange 47 or 49 that is preferably substantially parallel to the impingement surface.

Figure 3:
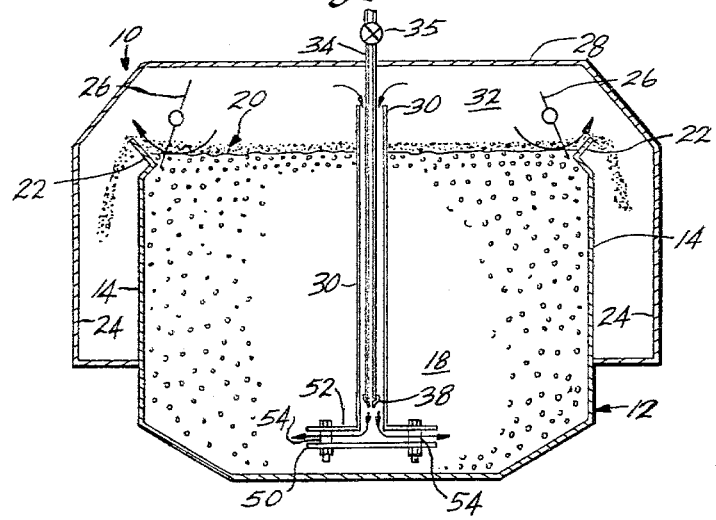
FIG. 3 is a fragmentary schematic view of a draft tube having a flange and an impingement surface mounted to the flange which can be adjusted upwardly or downwardly for directing a radially outward flow of bubbles into the liquid in the tank at any desired level.

In FIG. 3, an impingement surface 50 is provided in the form of a plate affixed to flange 52 with spacers 54 at the lower end of draft tube 30. The assembly of plate 50, nozzle 38, and draft tube 30 is adjustable upwardly and downwardly between the bottom of the tank and the operating level 20 of the liquid to direct a radially outward flow of bubbles into the volume of liquid in the tank at any desired level.

Figure 2:
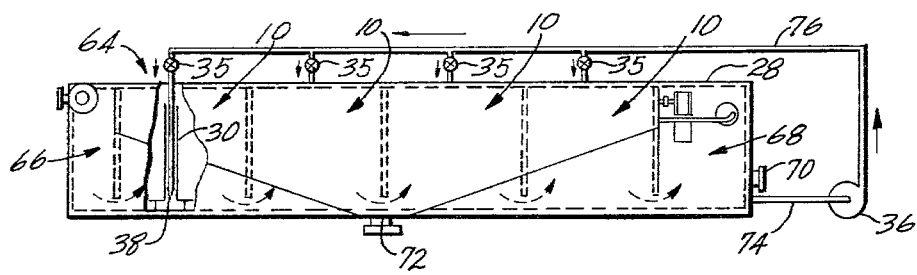
FIG. 2 is a schematic elevation view partly broken away showing several of the mixing units of FIG. 1 connected in series to provide an improved flotation separator.

FIG. 2 shows a flotation separation unit 64 which includes four of the flotation cells 10 in series, although fewer or more of the cells 10 may be used in series without departing from the scope of this invention.

In use, liquid with material or contaminates to be separated by flotation is added to an inlet well 66 adjacent the first mixing cell in the series. The liquid flows into the first mixing cell through an opening in the lower portion of the end wall of the first cell adjacent the well 66. The liquid is mixed with gas drawn down the draft tube by the stream of fluid forced from the nozzle toward the bottom of the tank. Some material to be floated is buoyed to the surface and swept away by the skimmers in the first mixing cell. The remaining liquid and contaminates flow from the first mixing cell to the second mixing cell through an opening in the bottom portion of the common end wall which separates the first mixing cell from the second. The liquid in the second cell is mixed with gas by a second nozzle and draft tube combination as described above, and additional matters buoyed to the surface and removed by the skimmers. The same flotation action occurs in the third and fourth cells and by the time the liquid leaves the fourth cell the bulk of the matter to be separated by flotation has been removed. Treated liquid flows through an outlet in the bottom of the wall in the fourth cell and into a discharge well 68 at the downstream end of the flotation separation apparatus. Treated liquid flows out a discharge pipe 70 in the bottom of the discharge well 68. The material removed by flotation is skimmed off by the rotating skimmer blades 26 over the adjustable weirs 22 and discharged from the troughs 24 through a drainpipe 72.

A stream of treated liquid is withdrawn from discharge well 68 through pipe 74 and is forced by pump 36 to manifold 76 and from the manifold 76 into the liquid feed pipes 34 in each cell. The liquid flow rate in each cell can be adjusted independently by means of valves 35.

Means for varying the area of the annular opening at the upper end of the draft tube such as an iris diaphragm or a cap over the end of the draft tube having an aperture of a predetermined diameter through which the water feed line 34 passes may be used to control the flow rate of gas into the draft tube independently of the flow rate of liquid through the nozzle.

Two units suitable for commercial use have been constructed, a four-cell unit having a 40 gallon per minute throughput and a single cell unit having a 3400 gallon per minute throughput. Tests on the single cell unit provided basis for the design of the four cell, 3400 gallon per minute unit described below. Both correspond substantially to the four cell unit illustrated in FIG. 2 and will be described with reference thereto.

The 40 gallon per minute unit has four identical cells 10, each having a liquid feed pipe 34, draft tube 30, and nozzle 38. Each cell measures 25¾ inches square in horizontal cross-section and has a liquid operating level of 13 9/16 inches. Each cell holds 40 gallons of liquid. The draft tube has an inner diameter of 2 1/16 inches, the liquid feed pipe an outer diameter of 1⅛ inches, and the nozzle an opening 5/16 inch in diameter. The draft tube flange is 6 inches in diameter. The spacing between the draft tube flange and the tank bottom is ¼ inch. The nozzle is 3 inches from the tank bottom. Water contaminated with oil and particulates is treated with a conventional frother and is admitted to inlet well 66 at 40 gallons per minute and flows serially through the four cells. In each cell, treated water from outlet well 68 is pumped through the nozzle at 15 to 40 gallons per minute, 15 gallons per minute giving desirable performance. The 3 horsepower centrifugal pump 36 pulls 40 to 160 gallons per minute from outlet well 68 to feed the nozzles, and 40 gallons per minute of treated water (less losses in the froth) flow from outlet 70. A flow of about 15 gallons per minute through each nozzle provides excellent flotation separation. Higher flow rates may be used for greater contact of gas and liquid, for example, for mixing ozone with liquid waste.

A one cell version of a 3400 gallon per minute four cell unit has been built and tested. The following is based on the results of these tests.

The 3400 gallon per minute unit also will have four cells, each having a liquid feed pipe, nozzle, and draft tube. Each cell measures 114 inches square in horizontal cross-section and has a liquid operating level of 61 inches. Each cell holds 3400 gallons of liquid. The draft tube has an inner diameter of 3 inches, the liquid feed pipe has an outer diameter of 1.3 inches, and the nozzle has an opening 1.3 inches in diameter. The draft tube flange is 7.5 inches in diameter. The spacing between the draft tube flange and the tank bottom is 3/16 inch. The nozzle is ¼ inch from the tank bottom. Water contaminated with oil and particulates is treated with a conventional frother and is admitted to the inlet well at 3400 gallons per minute and flows serially through the four cells. In each cell, treated water from outlet well 68 is pumped through each nozzle at about 100 to 400 gallons per minute. A 60 horsepower pump 36 pulls 400 to 1600 gallons per minute from outlet well 68 to feed the nozzles, and 3400 gallons per minute ot treated water (less losses in the froth) flow from outlet 70. Treated water is recirculated through the unit at a rate of about 0.1 to about 0.5 times the throughput rate, providing highly effective removal of contaminants.

A mixing apparatus of the present invention is especially well adapted for mixing gas with liquid. There is now growing interest in the use of ozone instead of chlorine to purify drinking water and to treat waste water such as sewage. Efficient contact between the gaseous ozone and the water being treated is essential. A mixing apparatus of the present invention having a sealed gas space 32 and a draft tube open to the gas space, particularly when operated at high recirculation rates, can provide efficient utilization of ozone by confining the ozone within the gas space, by dispersing bubbles containing ozone through the water in the unit, and by repeatedly recirculating treated water into contact with bubbles containing ozone.

Although the present invention has been described in terms of particular details and embodiments thereof, numerous variations will be apparent to those skilled in the art. For example, a multicell flotator unit may include one or more hydraulic powered cells of the present invention and one or more cells having mechanical impellers, shrouds, and vanes. The particulars of the description are thus intended to illustrate but not to limit the invention, the scope of which is set forth in the following claims.

What is claimed is:

1. Mixing apparatus comprising:
    a tank for holding a volume of liquid;
    means for establishing an operating level for the liquid in the tank and a gas space above the liquid;
    an upright draft tube disposed within the tank extending from above the operating level of the liquid to below the operating level of the liquid, the draft tube being in fluid communication with the tank at a level below the operating level of the liquid;
    an impingement surface transverse to the draft tube below the level of fluid communication,
    the upper portion of the draft tube being in communication with gas above the liquid for admitting gas into the draft tube to be mixed with the liquid in the tank;
    a nozzle disposed within the draft tube at a substantial distance below the operating level for the liquid in the tank for directing a stream of liquid downwardly against the impingement surface;
    a flange on the draft tube and spaced between about 0.1" and about 1" above the impingement surface; and means for forcing the stream of liquid through the nozzle against the impingement surface to entrain bubbles of gas in the stream of liquid, the impingement surface and flange being disposed to deflect the stream of liquid and entrained bubbles radially outwardly from the draft tube into the volume of liquid in the tank.

2. Apparatus of claim 1 in which the impingement surface is spaced from the bottom of the tank by no more than about ¼ of the operating level of the liquid in the tank.

3. The apparatus of claim 1 in which the impingement surface is a portion of the bottom of the tank.

4. The apparatus of claim 1 in which the nozzle is between about ⅛ inch and about 5 draft tube diameters above the impingement surface.

5. The apparatus of claim 1 further including means for adjusting the volumetric flow rate of liquid through the nozzle.

6. The apparatus of claim 1 further including means for adjusting the volumetric flow rate of gas through the gas tube.

7. Mixing apparatus comprising:
a tank having a bottom and a side wall for holding a volume of liquid;
means for establishing an operating level for the liquid in the tank;
an upright draft tube disposed within the tank having an upper end in communication with a gas space above the operating level of liquid and a lower open end near the bottom of the tank;
a liquid feed pipe extending downwardly within the draft tube for a substantial distance below where the upper end of the draft tube communicates with the gas space, the pipe being disposed within the draft tube to leave a path for the flow of gas between them, the pipe terminating in a nozzle disposed a substantial distance below the operating level for the liquid in the tank for directing a stream of liquid downwardly against the bottom of the tank;
a flange on the draft tube and spaced between about 0.1" and about 1" from the bottom of the tank; and
means for forcing a stream of liquid through the nozzle and out the space between the flange and the bottom of the tank to draw gas down the draft tube and create a pattern of bubbles flowing radially outwardly from the draft tube across the bottom of the tank and upwardly into the volume of liquid in the tank.

8. The apparatus of claim 7 in which the nozzle is between about ⅛ inch and about 5 draft tube diameters from the bottom of the tank.

9. Apparatus of claim 7 further comprising means for adjusting the volumetric flow rate of liquid through the nozzle.

10. The apparatus of claim 7 comprising a plurality of said upright draft tubes, liquid feed pipes, and nozzles.

11. Flotation apparatus comprising:
a first tank having a bottom and an upwardly extending wall;
means for introducing into the first tank a two-phase liquid mixture having a liquid component and an immiscible component;
a first mixing unit for adding and mixing gas with the two-phase liquid mixture to form gas bubbles which attach themselves to some of the immiscible component to buoy it to the surface in the form of a froth;
a second tank adjacent to the first tank and having a bottom and an upwardly extending wall;
an inlet in the second tank connected to an outlet in the first tank to receive a portion of the two-phase liquid mixture from the first tank;
a second mixing unit for adding and mixing gas with the two-phase liquid mixture in the second tank to form gas bubbles which attach themselves to some of the insoluble component to buoy it to the surface in the form of a froth;
means for establishing an operating level for liquid in each tank;
each mixing unit for adding and mixing gas including an upright draft tube disposed within the tank having an upper end in communication with a gas space above the operating level of the liquid and a lower open end near the bottom of the tank, a liquid feed pipe extending downwardly within the draft tube for a substantial distance below where the upper end of the draft tube communicates with the gas space, the pipe being disposed within the draft tube to leave a path for the flow of gas between them, the pipe terminating in a nozzle disposed a substantial distance below the operating level for the liquid in the tank for directing a stream of liquid downwardly against the bottom of the tank;
a flange on each draft tube and spaced between about 0.1" and about 1" above the bottom of the corresponding tank; and
means for forcing the stream of liquid through each nozzle and out the space between the flange and the bottom of the corresponding tank to draw gas down the draft tube and create a pattern of bubbles flowing radially outwardly from each draft tube across the bottom of the corresponding tank and upwardly through the volume of liquid in the tank.

12. The apparaus of claim 11 in which the means for forcing the liquid through the nozzles includes a manifold connected to each liquid feed pipe, a pump connected to the manifold, and means for conveying a stream of treated liquid from an outlet of the second tank to the pump, whereby the pump forces treated liquid through the nozzles.

13. The apparatus of claim 11 further including gas tight cover means on the tanks for defining a sealed space in gas communication with the upper end of each draft tube, and means for admitting gas to the sealed space.

* * * * *